United States Patent [19]

Song

[11] Patent Number: 5,546,599
[45] Date of Patent: Aug. 13, 1996

[54] PROCESSING SYSTEM AND METHOD OF OPERATION FOR PROCESSING DISPATCHED INSTRUCTIONS WITH DETECTED EXCEPTIONS

[75] Inventor: Seungyoon P. Song, Austin, Tex.

[73] Assignee: International Business Machines Corporation, Armonk, N.Y.

[21] Appl. No.: 221,438

[22] Filed: Mar. 31, 1994

[51] Int. Cl.$^6$ ........................................... G06F 9/38
[52] U.S. Cl. ............... 395/800; 364/263.2; 364/263; 364/262.4; 364/231.8; 364/DIG. 1; 395/375
[58] Field of Search ................................. 395/800, 375

[56] References Cited

U.S. PATENT DOCUMENTS

| | | | |
|---|---|---|---|
| 5,051,940 | 9/1991 | Vassiliadis et al. | 364/736 |
| 5,077,692 | 12/1991 | McMinn | 365/230.06 |
| 5,129,067 | 7/1992 | Johnson | 395/375 |
| 5,136,697 | 8/1992 | Johnson | 395/375 |
| 5,177,701 | 1/1993 | Iwasa | 364/736 |
| 5,197,135 | 3/1993 | Eickemeyer et al. | 395/375 |
| 5,202,889 | 4/1993 | Aharon et al. | 371/27 |
| 5,214,763 | 5/1993 | Blaner et al. | 395/375 |
| 5,222,244 | 6/1993 | Carbine et al. | 395/800 |
| 5,257,214 | 10/1993 | Mason et al. | 364/736.5 |
| 5,257,216 | 10/1993 | Sweedler | 364/748 |
| 5,261,066 | 11/1993 | Jouppi et al. | 395/425 |
| 5,268,855 | 12/1993 | Mason et al. | 364/748 |
| 5,274,818 | 12/1993 | Vasilevsky et al. | 395/700 |
| 5,333,296 | 7/1994 | Bouchard | 395/425 |
| 5,341,482 | 8/1994 | Cutler | 395/375 |
| 5,390,305 | 2/1995 | Takahashi | 395/375 |

OTHER PUBLICATIONS

*IEEE Transactions on Computers*, vol. 39, No. 3, Mar. 1990, "Instruction Issue Logic for High–Performance, Interruptible, Multiple Functional Unit, Pipelined Computers" to G. S. Sohi, pp. 349–359.
Interrupt Handling for out–of–order Execution Processors, IEEE Trans. on Computers, vol. 42, No. 1, Jan. 1993, pp. 122–127.
Implementing Precise Interruptions in Pipelined RISC Processors, IEEE Micro, Aug. 1993, pp. 36–43.
Implementing Precise Interrupts in Pipelined Processors by J. Smith et.al, IEEE Trans. on Computers, May 1988, vol. 37, No. 5 pp. 562–572.
Speculative Execution Exception Recovery using Write–back Suppression by R. A. Bringmann et.al, IEEE, 1993 pp. 214–223.

*Primary Examiner*—Eric Coleman
*Attorney, Agent, or Firm*—Michael A. Davis, Jr.

[57] ABSTRACT

A processing system and method of operation are provided. A determination is made about whether to dispatch an instruction to execution circuitry for execution. After determining to dispatch the instruction, a determination is made about whether an exception condition exists for the instruction. The instruction is dispatched to the execution circuitry. In response to determining an exception condition exists for the instruction, an indication is output to inhibit execution of the instruction by the execution circuitry.

16 Claims, 21 Drawing Sheets

— 76

| BUFFER NUMBER | INSTRUCTION TYPE | | #GPR DEST. | #FPR DEST. | FINISHED | EXCEPTION |
|---|---|---|---|---|---|---|
| | EXECUTION UNIT | EOK | | | | |
| 0 | 22 | 0 | 1 | 0 | 0 | 0 |
| 1 | 22 | 0 | 1 | 0 | 0 | 0 |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |

| BUFFER NUMBER | INSTRUCTION TYPE | | #GPR DEST. | #FPR DEST. | FINISHED | EXCEPTION |
|---|---|---|---|---|---|---|
| | EXECUTION UNIT | EOK | | | | |
| 0 | | | | | | |
| 1 | | | | | | |
| 2 | | | | | | |
| 3 | | | | | | |
| 4 | | | | | | |
| 5 | | | | | | |
| 6 | | | | | | |
| 7 | 24 | 1 | 1 | 0 | 1 | 0 |
| 8 | 22 | 1 | 1 | 0 | 1 | 0 |
| 9 | 28 | 1 | 2 | 0 | 1 | 0 |
| 10 | 28 | 1 | 2 | 0 | 1 | 0 |
| 11 | | | | | | |
| 12 | | | | | | |
| 13 | | | | | | |
| 14 | | | | | | |
| 15 | | | | | | |

START OF CYCLES 4 AND 5 — 34

| BUFFER NUMBER | REGISTER NUMBER | INFORMATION |
|---|---|---|
| 0 | | |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

82 ) WRITE-BACK
COMPLETION
84 )
ALLOCATION
80 )

FIG. 8b

START OF CYCLE 6 — 34

| BUFFER NUMBER | REGISTER NUMBER | INFORMATION |
|---|---|---|
| 0 | | |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

82 ) WRITE-BACK
84
COMPLETION
ALLOCATION
80 )

FIG. 8c

START OF CYCLE 7 — 34

| BUFFER NUMBER | REGISTER NUMBER | INFORMATION |
|---|---|---|
| 0 | | |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

82 ) WRITE-BACK
84
COMPLETION
ALLOCATION
80 )

FIG. 8d

START OF CYCLE 8 — 34

| BUFFER NUMBER | REGISTER NUMBER | INFORMATION |
|---|---|---|
| 0 | | |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

82 ) WRITE-BACK
COMPLETION
84
ALLOCATION
80 )

START OF CYCLES 4 AND 5

| BUFFER NUMBER | REGISTER NUMBER | INFOR-MATION |
|---|---|---|
| 0 | | |
| 1 | | |
| 2 ← COMPLETION 94 | | |
| 3 | | |
| 4 | | |
| 5 | | |
| 6 | | |
| 7 | | |
| 8 ← ALLOCATION 90 | | |
| 9 | | |
| 10 | | |
| 11 | | |

FIG. 10a

START OF CYCLE 6

| BUFFER NUMBER | REGISTER NUMBER | INFOR-MATION |
|---|---|---|
| 0 | | |
| 1 | | |
| 2 | | |
| 3 | | |
| 4 ← COMPLETION 94 | | |
| 5 | | |
| 6 | | |
| 7 | | |
| 8 ← ALLOCATION 90 | | |
| 9 | | |
| 10 | | |
| 11 | | |

FIG. 10b

START OF CYCLE 7

| BUFFER NUMBER | REGISTER NUMBER | INFOR-MATION |
|---|---|---|
| 0 | | |
| 1 | | |
| 2 | | |
| 3 | | |
| 4 | | |
| 5 | | |
| 6 ← COMPLETION 94 | | |
| 7 | | |
| 8 ← ALLOCATION 90 | | |
| 9 | | |
| 10 | | |
| 11 | | |

FIG. 10c

START OF CYCLE 8

| BUFFER NUMBER | REGISTER NUMBER | INFOR-MATION |
|---|---|---|
| 0 | | |
| 1 | | |
| 2 | | |
| 3 | | |
| 4 | | |
| 5 | | |
| 6 | | |
| 7 ← COMPLETION 94 | | |
| 8 ← ALLOCATION 90 | | |
| 9 | | |
| 10 | | |
| 11 | | |

FIG. 10d

| BUFFER NUMBER | INSTRUCTION TYPE | | #GPR DEST. | #FPR DEST. | FINISHED | EXCEPTION |
|---|---|---|---|---|---|---|
| | EXECUTION UNIT | EOK | | | | |
| 0 | | | | | | |
| 1 | | | | | | |
| 2 | | | | | | |
| 3 | 22 | 1 | 2 | 0 | 0 | 0 |
| 4 | 24 | 1 | 1 | 0 | 1 | 0 |
| 5 | 28 | 0 | 0 | 0 | 0 | 0 |
| 6 | 26 | 1 | 1 | 0 | 1 | 0 |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |

FIG. 12a

| BUFFER NUMBER | INSTRUCTION TYPE | | #GPR DEST. | #FPR DEST. | FINISHED | EXCEPTION |
|---|---|---|---|---|---|---|
| | EXECUTION UNIT | EOK | | | | |
| 0 | | | | | | |
| 1 | | | | | | |
| 2 | | | | | | |
| 3 | 22 | 1 | 2 | 0 | 1 | 0 |
| 4 | 24 | 1 | 1 | 0 | 1 | 0 |
| 5 | 28 | 0 | 0 | 0 | 1 | 0 |
| 6 | 26 | 1 | 1 | 0 | 1 | 0 |
| 7 | 22 | 0 | 1 | 0 | 0 | 0 |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |

FIG. 12b

| BUFFER NUMBER | INSTRUCTION TYPE | | #GPR DEST. | #FPR DEST. | FINISHED | EXCEPTION |
| --- | --- | --- | --- | --- | --- | --- |
| | EXECUTION UNIT | EOK | | | | |
| 0 | | | | | | |
| 1 | | | | | | |
| 2 | | | | | | |
| 3 | | | | | | |
| 4 | | | | | | |
| 5 | | | | | | |
| 6 | | | | | | |
| 7 | 22 | 1 | 1 | 0 | 1 | 0 |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |

FIG. 12c

START OF CYCLE 4

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | 0 | | 0 |
| 3 | | | 0 | | 0 |
| 4 | | | 0 | | 1 |
| 5 | | | 0 | | 0 |
| 6 | | | | | |
| 7 | | | | | |
| 8 | | | | | |
| 9 | | | | | |
| 10 | | | | | |
| 11 | | | | | |

FIG. 14a

START OF CYCLE 5

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | DATA | 1 | | 0 |
| 3 | | DATA | 1 | | 0 |
| 4 | | | 0 | | 1 |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

FIG. 14b

START OF CYCLE 6

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | DATA | 1 | CA | 1 |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

START OF CYCLE 7

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

START OF CYCLE 8

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | 0 | | 0 |
| 6 | | DATA | 1 | CA | 1 |
| 7 | | | | | |
| 8 | | | | | |
| 9 | | | | | |
| 10 | | | | | |
| 11 | | | | | |

START OF CYCLE 9

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | DATA | 1 | | 0 |
| 6 | | DATA | 1 | CA | 1 |
| 7 | | | | | |
| 8 | | | | | |
| 9 | | | | | |
| 10 | | | | | |
| 11 | | | | | |

START OF CYCLE 4

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | 0 | | 0 |
| 3 | | | 0 | | 0 |
| 4 | | | 0 | | 1 |
| 5 | | | 0 | | 0 |
| 6 | | | | | |
| 7 | | | | | |
| 8 | | | | | |
| 9 | | | | | |
| 10 | | | | | |
| 11 | | | | | |

START OF CYCLE 5

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | DATA | 1 | | 0 |
| 3 | | DATA | 1 | | 0 |
| 4 | | | 0 | | 1 |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

START OF CYCLE 6

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | DATA | 1 | CA | 1 |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

FIG. 16c

START OF CYCLE 7 AND 8

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | 0 | | 0 |
| 6 | | | 0 | | 1 |
| 7 | | | | | |
| 8 | | | | | |
| 9 | | | | | |
| 10 | | | | | |
| 11 | | | | | |

FIG. 16d

START OF CYCLE 9

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | DATA | 1 | | 0 |
| 6 | | | 0 | | 1 |
| 7 | | | | | |
| 8 | | | | | |
| 9 | | | | | |
| 10 | | | | | |
| 11 | | | | | |

FIG. 16e

START OF CYCLE 10

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | | | |
| 6 | | | 0 | | 1 |
| 7 | | | | | |
| 8 | | | | | |
| 9 | | | | | |
| 10 | | | | | |
| 11 | | | | | |

FIG. 16f

START OF CYCLE 11

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | | | |
| 6 | | DATA | 1 | CA | 1 |
| 7 | | | | | |
| 8 | | | | | |
| 9 | | | | | |
| 10 | | | | | |
| 11 | | | | | |

START OF CYCLE 12

| BUFFER NUMBER | REGISTER NUMBER | INFO | INFO VALID | CARRY | CARRY VALID |
|---|---|---|---|---|---|
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |

PROCESSING SYSTEM AND METHOD OF OPERATION FOR PROCESSING DISPATCHED INSTRUCTIONS WITH DETECTED EXCEPTIONS

CROSS-REFERENCES TO RELATED APPLICATIONS

This patent application is related to copending U.S. patent application Ser. No. 08/508,121, file wrapper continuation of Ser. No. 08/220,993, entitled Processing System and Method of Operation, by S. P. Song, and to copending U.S. patent application Ser. No. 08/220,998, entitled Processing System and Method of Operation, by S. P. Song, and to copending U.S. patent application Ser. No. 08/483,905, continuation of Ser. No. 08/221,329, entitled Processing System and Method of Operation, by S. P. Song, each filed concurrently herewith.

TECHNICAL FIELD

This patent application relates in general to systems for processing information and in particular to a processing system and method of operation.

BACKGROUND OF THE INVENTION

A superscalar processing system includes multiple execution units for simultaneously executing multiple instructions. In some processing systems, instructions are executable out-of-order relative to their programmed sequence within the instruction stream. Nevertheless, some of these processing systems are designed to dispatch instructions to execution circuitry in-order of the instructions' programmed sequence. According to typical previous techniques, such in-order dispatch adversely impacts the processing system's ability to dispatch multiple instructions during a single machine cycle, particularly as the single machine cycle is shortened.

Thus, a need has arisen for a processing system and method of operation, in which in-order dispatch less adversely impacts the processing system's ability to dispatch multiple instructions during a single machine cycle.

SUMMARY OF THE INVENTION

In a processing system and method of operation, a determination is made about whether to dispatch an instruction to execution circuitry for execution. After determining to dispatch the instruction, a determination is made about whether an exception condition exists for the instruction. The instruction is dispatched to the execution circuitry. In response to determining an exception condition exists for the instruction, an indication is output to inhibit execution of the instruction by the execution circuitry.

It is a technical advantage of the present invention that in-order dispatch less adversely impacts the processing system's ability to dispatch multiple instructions during a single machine cycle.

BRIEF DESCRIPTION OF THE DRAWINGS

An exemplary embodiment of the present invention and its advantages are better understood by referring to the following descriptions and accompanying drawings, in which:

FIG. 4 is a conceptual illustration of a reorder buffer of the sequencer unit of FIG. 3;

FIG. 6 is a conceptual illustration of a reorder buffer of the processor of FIG. 1;

FIGS. 8a, 8b, 8c, 8d are conceptual illustrations of rename buffers of the processor of FIG. 1;

FIGS. 10a, 10b, 10c, 10d are conceptual illustrations of rename buffers of a processor according to FIG. 9;

FIGS. 12a, 12b, 12c are conceptual illustrations of a reorder buffer of the processor of FIG. 1;

FIGS. 14a, 14b, 14c, 14d, 14e, 14f, and 14g are conceptual illustrations of rename buffers of the processor of FIG. 1;

FIGS. 16a, 16b, 16c, 16d, 16e, 16f, 16g, 16h are conceptual illustrations of rename buffers of the processor of FIG. 1 at various cycles of the instruction processing illustrated in FIG. 15.

DETAILED DESCRIPTION

An exemplary embodiment of the present invention and its advantages are better understood by referring to FIGS. 1–16h of the drawings, like numerals being used for like and corresponding parts of the accompanying drawings.

Figure 1:
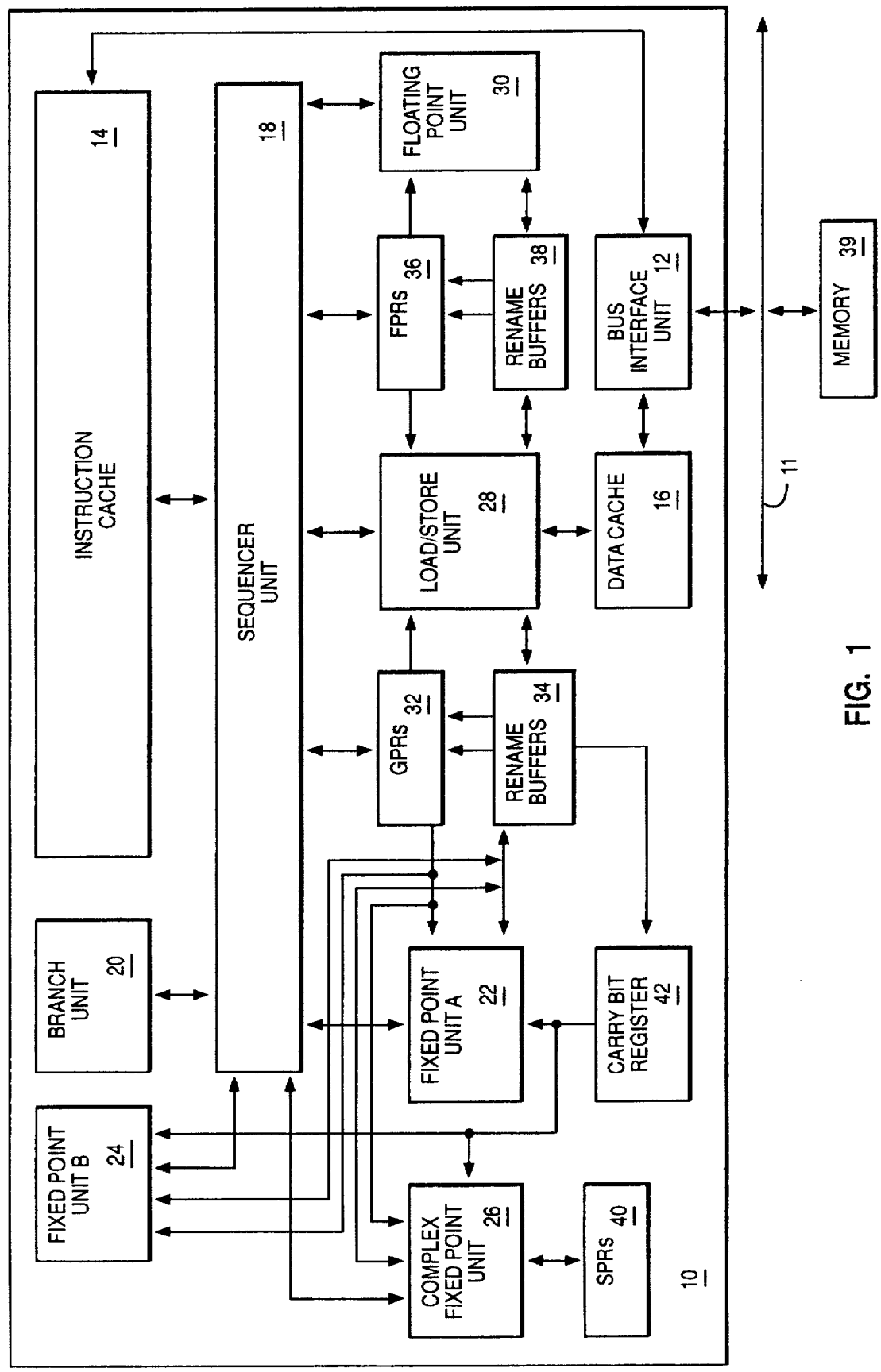
FIG. 1 is a block diagram of a processor for processing information according to the preferred embodiment.

FIG. 1 is a block diagram of a processor 10 system for processing information according to the preferred embodiment. In the preferred embodiment, processor 10 is a single integrated circuit superscalar microprocessor. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. As discussed further hereinbelow in connection with FIGS. 6–10, sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called. "pipelining". In a significant aspect of the preferred embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete" as discussed further hereinbelow in connection with FIGS. 3–4. Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer as discussed further hereinbelow in connection with FIGS. 6–10. Likewise, in the writeback stage of a particular instruction, processor 10 updates its architectural states in response to the particular instruction. Processor 10 processes the respective "writeback" stages of instructions in order of their programmed sequence. As discussed further hereinbelow in connection with FIGS. 6–10, processor 10 advantageously merges an instruction's completion stage and writeback stage in specified situations.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Figure 2:
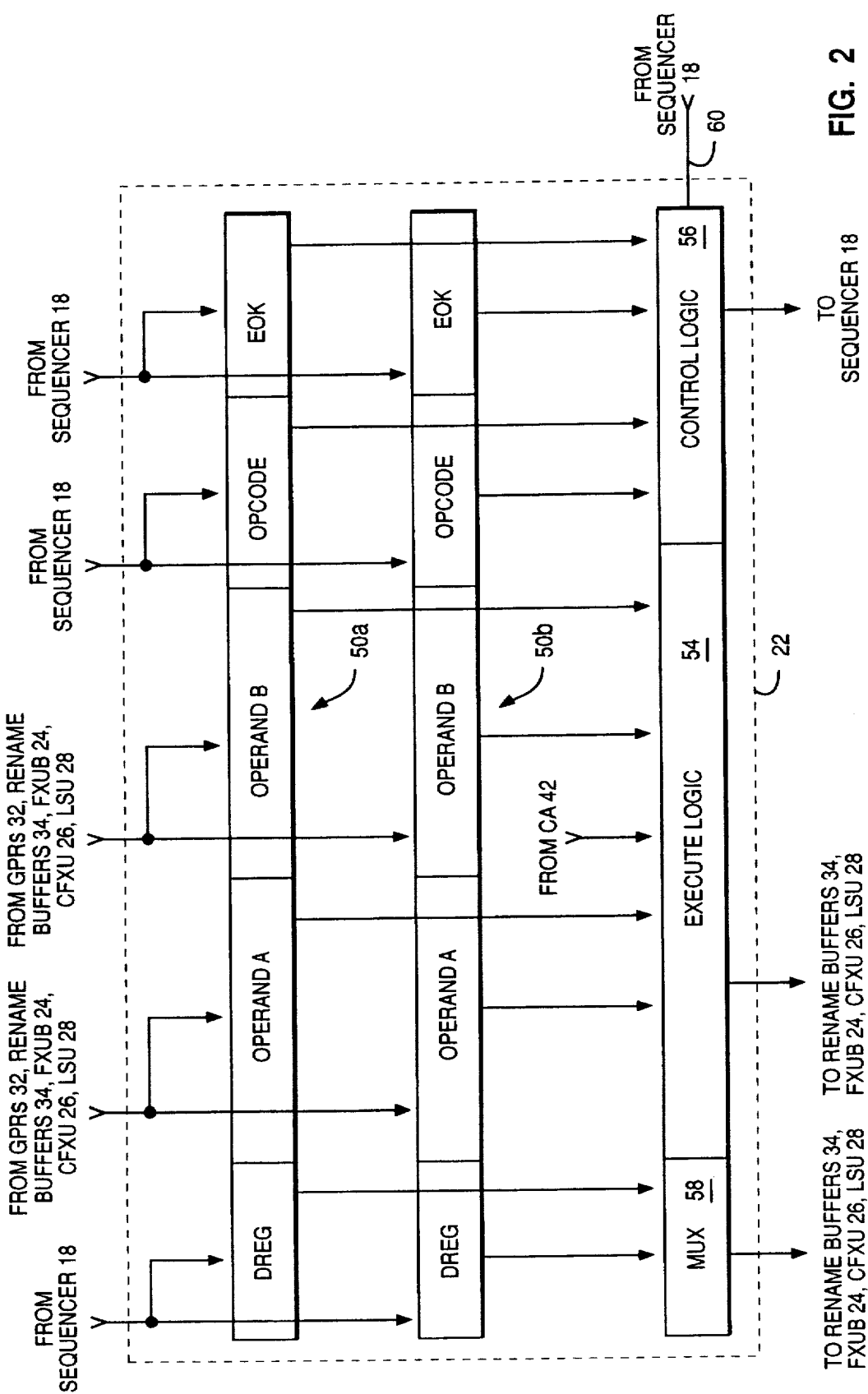
FIG. 2 is a block diagram of a fixed point execution unit of the processor of FIG. 1.

FIG. 2 is a block diagram of FXUA 22 of processor 10. FXUA 22 includes reservation stations indicated generally at 50a and 50b. Likewise, each of branch unit 20, FXUB 24, CFXU 26, LSU 28, and FPU 30 has respective reservation stations. For clarity, the operation is discussed hereinbelow only of FXUA 22 and its reservation stations as exemplifying the operation of other execution units and their respective reservation stations.

Each of reservation stations 50a–b is able to store information for a respective instruction dispatched from sequencer unit 18 for execution by FXUA 22. Each reservation station includes a respective destination register field, operand A field, operand B field, and opcode field. Moreover, in a significant aspect of the preferred embodiment, each reservation station further includes a respective execution-allowed ("EOK") field.

In its destination register field, a reservation station identifies at least one destination register (as specified by sequencer unit 18) for the reservation station's respective instruction. Similarly, in its respective operand A and operand B fields, a reservation station stores source operand information (from GPRs 32, rename buffers 34, FXUB 24, CFXU 26 or LSU 28) for the reservation station's respective instruction. In its opcode field, a reservation station stores an opcode (as specified by sequencer unit 18) indicating the operation to be executed by FXUA 22 on the source operand information in response to the reservation station's respective instruction.

In response to signals from control logic 56, execute logic 54 inputs the source operand information from a reservation station's operand A and operand B fields and executes an operation (indicated by the reservation station's stored opcode) thereupon. Information resulting from such an operation is output from execute logic 54 to rename buffers 34, FXUB 24, CFXU 26 and LSU 28. Such information is stored in a selected one of rename buffers 34. In response to a destination register identified by the output of a multiplexer 58, the stored information is associated (within the selected rename buffer) with one of GPRs 32.

In a significant aspect of the preferred embodiment, a reservation station further stores EOK information (as specified by sequencer unit 18) in its EOK field. Advantageously, such EOK information accommodates certain situations where processor 10 delays execution of an execution serialized instruction. Execution serialization is a technique for delaying instruction execution in multiple-pipeline, out-of-order execution processors such as processor 10. In a first situation where processor 10 delays execution of an execution serialized instruction, the instruction is not to be executed speculatively. In a second situation where processor 10 delays execution of an execution serialized instruction, an instruction is delayed in execution until all its source operand information is available and valid.

With respect to the first situation (where the instruction is not to be executed speculatively), processor 10 normally executes instructions speculatively such that instructions are executed out-of-order relative to their programmed sequence within the instruction stream. Accordingly, instructions' results (destination operand information) are not necessarily available in-order of the instructions' programmed sequence. However, processor 10 writes instructions' results back to architectural registers (e.g. GPRs 32 and FPRs 36) in-order of the instructions' programmed sequence. For this reason, processor 10 includes rename buffers 34 and 38 for intermediately storing instructions' results until a suitable moment (i.e. finishing execution of all preceding instructions with no exception conditions) for writing the intermediately stored results back to architectural registers.

Nevertheless, as an example in the preferred embodiment, some instructions operate on SPRs 40 (FIG. 1), where instructions' results are written directly to SPRs 40 without intermediate storage in rename buffers. An example of such an instruction is a Move To instruction, in which CFXU 26 moves information to one of SPRs 40 from one of GPRs 32. As shown in FIG. 1, CFXU 26 is connected to SPRs 40. A Move To instruction immediately updates one of SPRs 40 upon execution. As another example, a Store instruction's result is written directly to a memory location in data cache 16 without intermediate storage in rename buffers.

Processor 10 does not speculatively execute such instructions (where the instructions' results are written directly to an architectural register or memory location without intermediate storage in rename buffers), so that processor 10 is able to achieve precise interrupts and precise exceptions. Moreover, since the instructions' results are written directly to an architectural register or memory location without intermediate storage in rename buffers, such instructions are processed without a writeback stage. Accordingly, to ensure in-order completion and writeback, processor 10 delays execution of such an instruction until completion of all preceding instructions.

Figure 3:
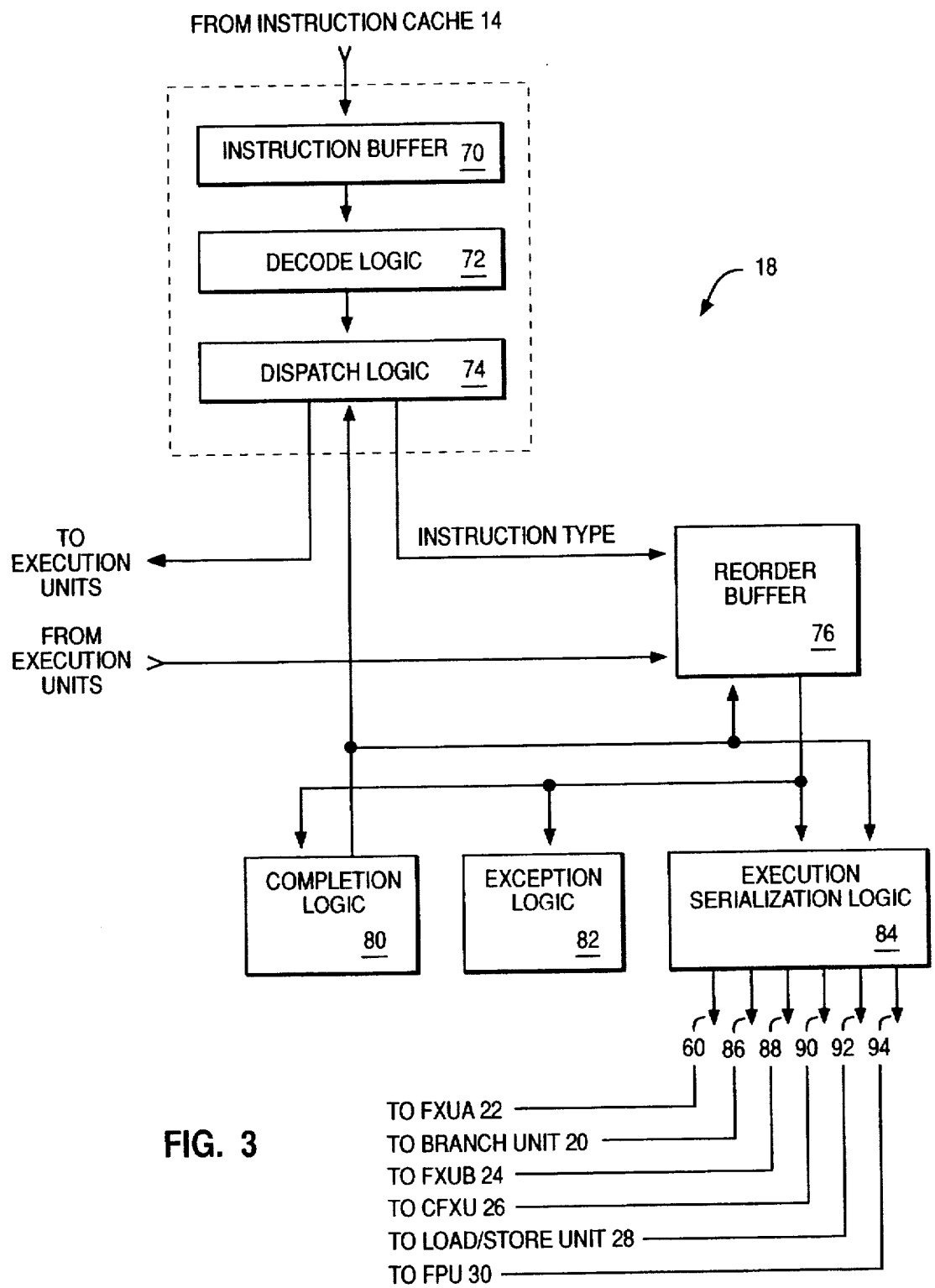
FIG. 3 is a block diagram of a sequencer unit of the processor of FIG. 1.

With respect to the second situation (where an instruction is delayed in execution until all its source operand information is available and valid), referring to FIG. 3, a reservation station temporarily stores information for a respective instruction whose source-operand information is not available at the time the instruction is dispatched from sequencer unit 18. In response to source operand information becoming available from an execution unit, the reservation station inputs and stores such source operand information. At a suitable moment, the reservation station forwards such source operand information to execute logic 54.

In the preferred embodiment, most instructions specify one or more of GPRs 32 and FPRs 36 as a source operand. Accordingly, in the preferred embodiment, the reservation stations include circuitry for forwarding information from the execution units.

Nevertheless, in the preferred embodiment, the reservation stations do not include circuitry for forwarding information from other types of source operands such as CA register 42 or SPRs 40. This is because the size and cost of such circuitry is not justified by the frequency of instructions that specify such unforwarded source operands. Instead, processor 10 of the preferred embodiment delays execution of an instruction specifying such unforwarded source operands at least until completion of all preceding instructions. In response of completion of all preceding instructions, the unforwarded source operands are read from a specified one of the architectural registers (e.g. SPRs 40). Examples of such instructions are (1) an extended arithmetic instruction that reads CA register 42 and (2) a Move From instruction which moves information from one of SPRs 40 to one of GPRs 32.

In summary, processor 10 delays execution of an execution serialized instruction at least until completion of all preceding instructions in two situations. In a first situation, the instruction is not to be executed speculatively. In the second situation, the instruction specifies at least one source operand for which processor 10 does not include forwarding circuitry. Advantageously, such situations are accommodated by sequencer unit 18 specifying EOK information to be stored in a reservation station.

If an instruction is subject to execution serialization, then sequencer unit 18 clears an EOK bit (within the EOK information stored in a reservation station's EOK field) to logical 0 when the instruction is dispatched to FXUA 22. By clearing the EOK bit to logical 0, sequencer unit 18 prevents FXUA 22 from executing the instruction, even if the instruction is otherwise ready for execution. Accordingly, FXUA 22 executes such an execution serialized instruction only in response to sequencer unit 18 outputting a signal through a line 60 as discussed further hereinbelow.

By comparison, if an instruction is not subject to execution serialization, then sequencer unit 18 sets the EOK bit to 1 when the instruction is dispatched to FXUA 22. By setting the EOK bit to logical 1, sequencer unit 18 allows FXUA 22 to execute the instruction as soon as the instruction's source operand information is available and valid.

FIG. 3 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

FIG. 4 is a conceptual illustration of a reorder buffer 76 of sequencer unit 18 of the preferred embodiment. As shown in FIG. 4, reorder buffer 76 has sixteen entries respectively labelled as buffer numbers 0–15. Each entry has five primary fields, namely an "instruction type" field, a "number-of-GPR destinations" field, a "number-of-FPR destinations" field, a "finished" field, and an "exception" field. Moreover, the instruction type field has an "execution unit" subfield and an "EOK" subfield.

Referring also to FIG. 3, as dispatch logic 74 dispatches an instruction to an execution unit, sequencer unit 18 assigns the dispatched instruction to an associated entry in reorder buffer 76. Sequencer unit 18 assigns entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 0 of FIG. 4, reorder buffer 76 indicates the instruction is dispatched to FXUA 22. Moreover, entry 0 indicates that the dispatched instruction is execution serialized, such that EOK=0 and processor 10 is to delay execution of the dispatched instruction at least until completion of all preceding instructions. Also, in entry 1, reorder buffer 76 indicates a subsequent instruction is execution serialized, such that EOK=0.

In other significant aspects of the preferred embodiment, entry 0 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

Referring again to FIG. 3, the entries of reorder buffer 76 are read by completion logic 80 and exception logic 82 of sequencer unit 18. Moreover, in a significant aspect of the preferred embodiment, the entries of reorder buffer 76 are read by execution serialization logic 84 of sequencer 18. In response to the "exception" fields of reorder buffer 76, exception logic 82 handles exceptions encountered during execution of dispatched instructions.

In response to the "finished" fields and "exception" fields of reorder buffer 76, completion logic 80 outputs signals to dispatch logic 74, to execution serialization logic 84, and to reorder buffer 76. Through these signals, completion logic 80 indicates "completion" of instructions in order of their programmed sequence. Completion logic 80 indicates "completion" of an instruction if it satisfies the following conditions:

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

In a significant aspect of the preferred embodiment, in response to the signals from completion logic 80, execution serialization logic 84 selectively outputs a signal to FXUA 22 through line 60. If a dispatched instruction to FXUA 22 has its associated EOK bit (in the "instruction type" field of the instruction's associated entry in reorder buffer 76) cleared to a logical 0, then execution serialization logic 84 outputs the signal through line 60 in response to "completion" of all instructions preceding the dispatched instruction. FXUA 22 executes such a dispatched instruction only in response to execution serialization logic 84 outputting the signal through line 60; when execution serialization logic 84 outputs the signal through line 60, such a dispatched instruction (having its associated EOK bit cleared to a logical 0) will be the oldest pending instruction in reservation stations 50*a–b* of FXUA 22 because instructions are "completed" in order of their programmed sequence.

Likewise, execution serialization logic 84 selectively outputs signals to execution units 20, 24, 26, 28 and 30 through lines 86, 88, 90, 92 and 94 respectively connected thereto.

Figure 5A:
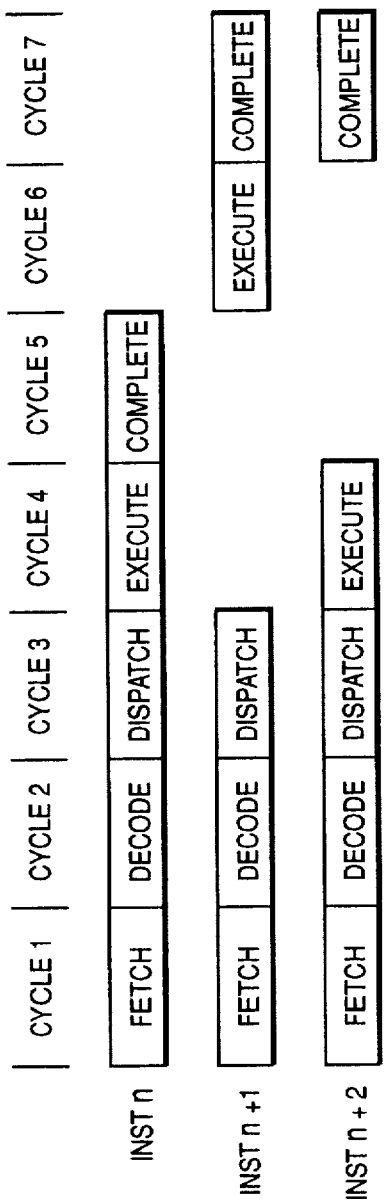
FIGS. 5a–5b are illustrations of the various stages of instructions processed by the processor of FIG. 1.
Figure 5B:
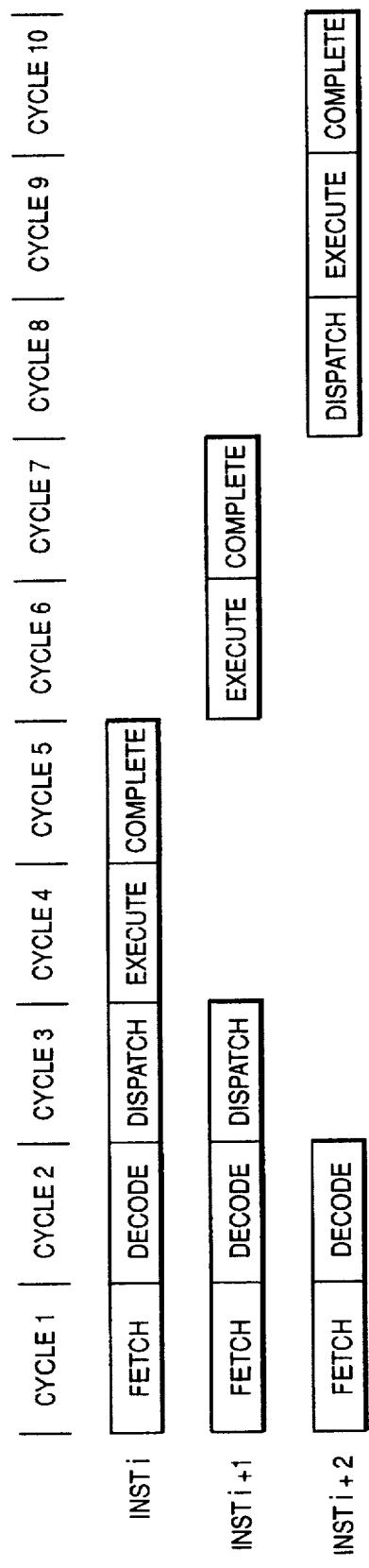

FIGS. 5*a–b* are illustrations of the various stages of instructions. Referring to FIG. 5*a*, execution (cycle 6) of an execution serialized instruction INST n+1 (e.g. a Move To instruction or a Move From instruction) is delayed until after completion of all preceding instructions (e.g. after cycle 5 of a preceding instruction INST n). Nevertheless, processor 10 advantageously does not delay dispatch (cycle 3) or execution (cycle 4) of an instruction INST n+2 that is preceded by execution serialized instruction INST n+1. In this manner, processor 10 achieves continued dispatch of instructions (such as INST n+2) that are preceded by an execution serialized instruction (such as INST n+1). Also, an execution unit of processor 10 is able to issue instructions out-of-order from the execution unit's reservation stations to its execute logic (e.g. execute logic 54 of FIG. 2), even if the oldest pending instruction in the execution unit's reservation station is subject to execution serialization.

Processor 10 of the preferred embodiment achieves higher performance than alternatives. As shown in FIG. 5b, according to one such alternative technique, dispatch (cycle 8) of an instruction INST i+2 is delayed in response to decoding (cycle 2) an instruction INST i+1 subject to execution serialization. In such an alternative technique, instruction dispatch (cycle 8) of instruction INST i+2 is resumed only after "completion" of all previously dispatched instructions (e.g. after cycle 7 of preceding execution serialized instruction INST i+1). A shortcoming of such an alternative technique is that execution is delayed for any instruction (such as INST i+2) that is preceded by an execution serialized instruction (such as INST i+1).

As previously stated, processor 10 achieves continued dispatch of instructions that are preceded by an execution serialized instruction. A Move From instruction is an execution serialized instruction and therefore benefits from the execution serialization technique of the preferred embodiment. Moreover, in another significant aspect of the preferred embodiment, processor 10 further includes circuitry for outputting results (destination operand information) of a Move From instruction for storage at a selected rename buffer before writeback of the destination operand information to one of GPRs 32.

Processor 10 supports such renaming, irrespective of whether the destination register of a Move From instruction is one of GPRs 32. In this manner, processor 10 uses its existing forwarding circuitry of its reservation stations, together with circuitry for searching rename buffers, to correctly match the destination operand information (of a Move From instruction) with a source register of an instruction dispatched after the Move From instruction. Accordingly, other instructions preceded by the Move From instruction are dispatchable at any time after dispatch of the Move From instruction. Without using such circuitry for the Move From instruction, other instructions preceded by the Move From instruction would not be dispatched until "completion" of the Move From instruction, because the other instructions might require (as their source operand information) the destination operand information of the Move From instruction.

In another significant aspect of the preferred embodiment, processor 10 streamlines instruction dispatching by responding to instruction fetch and decode related exceptions ("IFDRE") in an advantageous manner. Processor 10 detects an instruction fetch or decode related exception at the fetch stage or decode stage if the exception condition is detectable entirely from the instruction and the state of processor 10. Examples of such instruction fetch or decode related exceptions are instruction access pagefault, instruction access storage protection violation, privileged instruction violation, and illegal instructions.

Advantageously, in response to detecting such an instruction fetch or decode related exception, sequencer unit 18 dispatches the IFDRE-causing instruction to a reservation station of an execution unit but with the EOK bit cleared to a logical 0 as discussed further hereinabove in connection with FIGS. 2–4. Moreover, sequencer unit 18 stores an indication of the IFDRE condition by setting "exception"=1 (while maintaining "finished"=0) in the IFDRE-causing instruction's associated entry in reorder buffer 76. Such an indication identifies the instruction as an IFDRE-causing instruction.

As discussed further hereinabove in connection with FIGS. 2–4, by clearing the EOK bit to logical 0, sequencer unit 18 prevents the execution unit from executing the dispatched instruction, even if the instruction is otherwise ready for execution. Accordingly, the execution unit executes such an instruction only in response to sequencer unit 18 outputting a signal through a respectively connected one of lines 60, 86, 88, 90, 92 or 94, as discussed further hereinabove in connection with FIGS. 2–4.

In response to completion of all instructions preceding the IFDRE-causing instruction, sequencer unit 18 processes the fetch or decode related exception rather than outputting a signal to the execution unit through the respectively connected one of lines 60, 86, 88, 90, 92 or 94. Thus, the IFDRE-causing instruction is never executed by the execution unit. Sequencer unit 18 recognizes the instruction as an IFDRE-causing instruction in response to "exception"=1 and "finished"=0 in the IFDRE-causing instruction's associated entry in reorder buffer 76.

In this manner, processor 10 streamlines and speeds instruction dispatching by dispatch logic 74 (FIG. 3), which is speed critical circuitry in a superscalar processor. Accordingly, processor 10 of the preferred embodiment achieves higher performance than alternatives. According to one such alternative technique, the processor never dispatches the IFDRE-causing instruction. Such an alternative technique results in complicated and slow dispatching because, for each instruction, the processor needs to detect any instruction fetch and decode related exception condition before determining whether to dispatch the instruction. For example, with such an alternative technique, the processor determines whether to dispatch the nth instruction in response to determining whether the nth instruction or any of the earlier n−1 instructions has a fetch or decode related exception condition.

By comparison, in the preferred embodiment, dispatch logic 74 (FIG. 3) operates independently of fetch or decode related exception conditions. Even after determining to eventually dispatch an instruction to an execution unit for execution, sequencer unit 18 determines whether an IFDRE condition exists for the instruction. If sequencer unit 18 determines an IFDRE condition exists for the instruction, then sequencer unit 18 outputs an indication of the IFDRE condition to inhibit execution of the instruction by the execution unit. More particularly, in response to sequencer unit 18 determining an IFDRE condition exists for the instruction, sequencer unit 18 outputs such an indication during actual dispatch by (1) setting "exception"=1 (while maintaining "finished"=0) in the IFDRE-causing instruction's associated entry in reorder buffer 76 and (2) clearing the EOK bit in the IFDRE-causing instruction's reservation station to a logical 0.

This is advantageous because, after deciding to dispatch an instruction, it is normally impractical to reverse the effects of such a decision and not eventually dispatch the instruction. Moreover, during the dispatch cycle, additional operations are performed after deciding to dispatch the instruction. Accordingly, processor 10 does not need to detect any exception condition before determining whether to dispatch each instruction. This is particularly advantageous for sequencer unit 18 to dispatch multiple instructions during a single cycle of processor 10.

Figure 7:
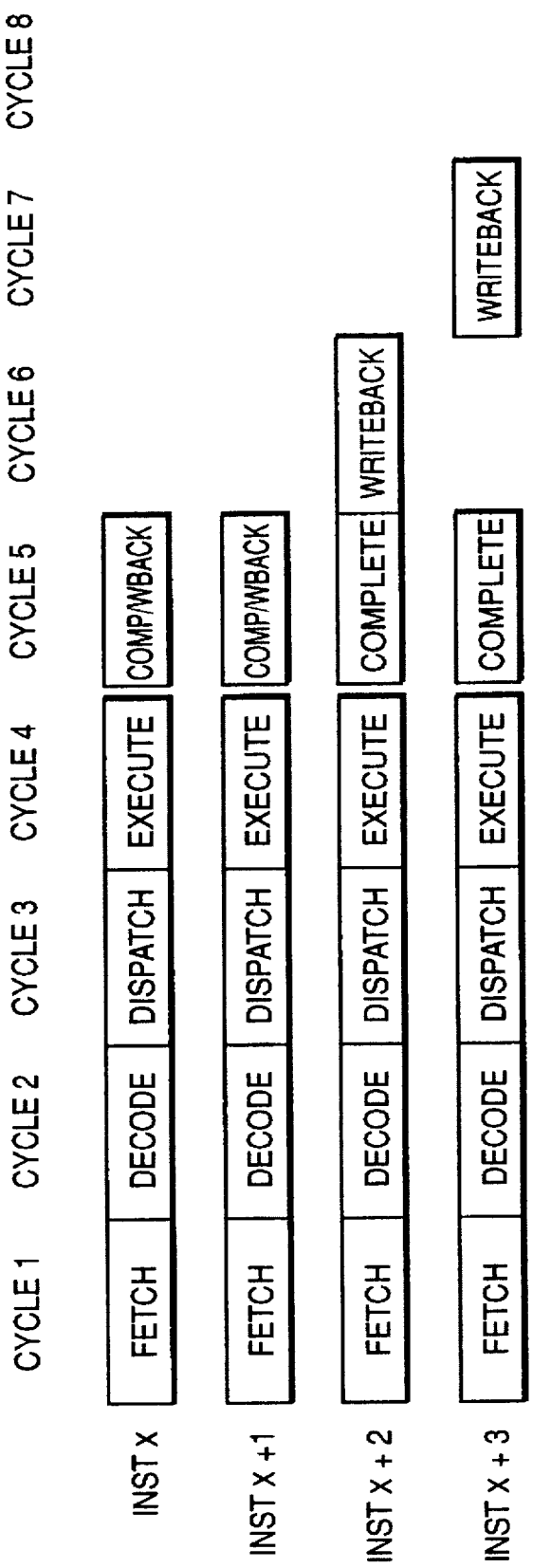
FIG. 7 is an illustration of the various stages of four instructions of FIG. 6.

FIG. 6 is a conceptual illustration of reorder buffer 76 in which four instructions are shown as finishing execution ("finished"=1) during the same cycle of processor 10. FIG. 7 is an illustration of the various stages of the four instructions of FIG. 6. FIGS. 8a–d are conceptual illustrations of rename buffers 34 of processor 10.

Referring to FIGS. 6–8, in a significant aspect of the preferred embodiment, writeback is independent of instruction completion, such that a "writeback" stage of an instruction processed by processor 10 is separable from the instruction's "completion" stage. Advantageously, by separating writeback from completion in this manner, processor 10 achieves efficient operation using fewer writeback ports between the rename buffers and the architectural registers. For example, as shown in FIG. 1, processor 10 of the preferred embodiment includes two writeback ports between rename buffers 34 and GPRs 32, and two writeback ports between rename buffers 38 and FPRs 36. With fewer writeback ports, the physical sizes of rename buffers 34 and 38 and of architectural registers 32 and 36 are reduced. Moreover, completion logic 80 (FIG. 3) is more streamlined, such that processor 10 more quickly determines whether a particular instruction can be "completed" during a present cycle.

In the preferred embodiment, processor 10 is able to "complete" up to four instructions per cycle. Also, in the preferred embodiment, each instruction can have up to two destination operands. Accordingly, if processor 10 did not support the separation of writeback from completion, processor 10 would need eight writeback ports (e.g. between rename buffers 34 and GPRs 32) to complete four instructions in a particular cycle if each of the four instructions has two destination operands. This is because "completion" of an instruction would require that a writeback port be available for each of the instruction's destination operands to be copied from a rename buffer to an associated architectural register.

With fewer writeback ports, the verification of writeback port availability becomes more complex as more instructions are considered for writeback during the same cycle. This is because the availability of a writeback port for a particular instruction during a particular cycle is dependent upon the number of writeback ports used for preceding instructions during the same cycle or preceding cycles.

Advantageously, by separating writeback from completion, completion logic 80 (FIG. 3) of processor 10 is more streamlined. This is because "completion" of an instruction is dependent upon the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

By separating completion from writeback, processor 10 copies destination operand information of a completed instruction from a rename buffer for storage in an architectural register during a particular cycle if a writeback port is available during the cycle. If a writeback port is not available during the cycle, then processor 10 copies the destination operand information of the completed instruction from the rename buffer to the architectural register during a later cycle when a writeback port is available.

Referring to FIG. 6, reorder buffer 76 stores information for four instructions finishing execution during the same cycle of processor 10. FIG. 7 shows the various stages of four instructions INST x, INST x+1, INST x+2, and INST x+3, which are respectively associated with reorder buffer numbers 7, 8, 9 and 10 of FIG. 6. Accordingly, instruction INST x has one destination operand ("number-of-GPR destinations"=1). Also, instruction INST x+1 has one destination operand ("number-of-GPR destinations"=1). By comparison, instruction INST x+2 has two destination operands ("number-of-GPR destinations"=2). Likewise, instruction INST x+3 has two destination operands ("number-of-GPR destinations"=2). As shown in FIG. 7, each of instructions INST x, INST x+1, INST x+2, and INST x+3 finishes execution at the end of cycle 4.

FIGS. 8a–d are conceptual illustrations of rename buffers 34 of processor 10. For clarity, the operation is discussed hereinbelow only of fixed point rename buffers 34 as exemplifying the operation of floating point rename buffers 38. As shown in FIGS. 8a–d, rename buffers 34 include twelve rename buffers respectively labelled as buffer numbers 0–11. Sequencer unit 18 allocates rename buffer numbers 0–11 to dispatched instructions on a first-in first-out basis and in a rotating manner, such that sequencer unit 18 allocates rename buffer number 0, followed sequentially by rename buffer numbers 1–11, and then rename buffer number 0 again.

Referring to FIGS. 8a–d, rename buffer 2 is allocated to store destination operand information for instruction INST x. Rename buffer 3 is allocated to store destination operand information for instruction INST x+1. Since instruction INST x+2 has two destination operands, both rename buffers 4 and 5 are allocated to store destination operand information for instruction INST x+2. Likewise, both rename buffers 6 and 7 are allocated to store destination operand information for instruction INST x+3.

FIG. 8a shows the status of an allocation pointer 80, a writeback pointer 82, and a completion pointer 84 at the start of cycles 4 and 5 of FIG. 7. Processor 10 maintains such pointers for controlling reading from and writing to rename buffers 34. Processor 10 maintains allocation pointer 80 to indicate whether a rename buffer is allocated to a particular instruction. As shown in FIG. 8a, allocation pointer 80 points to rename buffer 8, thereby indicating that rename buffer 8 is the next rename buffer available for allocation to an instruction.

In a significant aspect of the preferred embodiment, processor 10 further maintains writeback pointer 82 to indicate whether a rename buffer (previously allocated to a particular instruction) is available for reallocation to another instruction. As shown in FIG. 8a, writeback pointer 82 points to rename buffer 2, thereby indicating that rename buffer 2 is the next rename buffer from which processor 10 will copy destination operand information (as stored in the rename buffer's "information" field of FIG. 8a) to one of GPRs 32 (as specified in the rename buffer's "register number" field of FIG. 8a).

Accordingly, processor 10 advances writeback pointer 82 (past a rename buffer previously allocated to a particular instruction) in response to processor 10 copying the result (destination operand information) of the particular instruction from the rename buffer for storage in an architectural register. In this manner, processor 10 reserves an allocated rename buffer to store the result (destination operand information) of the particular instruction until processor 10 copies the result to an architectural register.

Also, processor 10 maintains completion pointer 84 to indicate (for a rename buffer previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 8a, completion pointer 84 points to rename buffer 2, thereby indicating that rename buffer 2 is the next rename buffer capable of satisfying Conditions 1, 2 and 3. in a significant aspect of the preferred embodiment, processor 10 maintains completion pointer 84 independent of whether the instruction's result is copied from the rename buffer for storage in an architectural register.

Accordingly, "rename entries" can be defined as the rename buffer pointed to by completion pointer 84 and its subsequent rename buffers that precede the rename buffer pointed to by allocation pointer 80. "Writeback entries" can be defined as the rename buffer pointed to by writeback pointer 82 and its subsequent rename buffers that precede the rename buffer pointed to by completion pointer 84. The writeback entries store results of instructions that are "complete" but whose results have not been copied from the rename buffers to architectural registers, as for example due to unavailability of write ports to the architectural registers.

Conceptually, the writeback entries are located between the rename entries and the architectural registers. Advantageously, a result may bypass the writeback entries and be written directly into the architectural registers if a writeback port is available at the completion stage. Moreover, like the rename entries, processor 10 operates the writeback entries to output information to an execution unit in situations where the execution unit executes an instruction specifying an architectural register associated with such information.

For example, FIG. 8b shows the status of allocation pointer 80, writeback pointer 82, and completion pointer 84 at the start of cycle 6 of FIG. 7. As shown in FIG. 8b, allocation pointer 80 is unchanged, because processor 10 has not dispatched additional instructions. By comparison, completion pointer 84 has advanced from rename register number 2 to rename register number 8, thereby indicating completion during cycle 5 of four instructions INST x, INST x+1, INST x+2, and INST x+3 having a total of six destination operands.

Moreover, in FIG. 8b, writeback pointer 82 has advanced from rename register number 2 to rename register number 4, thereby indicating writeback during cycle 5 of destination operation information for instructions INST x and INST x+1. FIG. 7 illustrates this fact by showing completion and writeback ("COMP/WBACK") occurring together during cycle 5 for instructions INST x and INST x+1. In this manner, the results (in rename register number 2 and rename register number 3) of instructions INST x and INST x+1 bypass the writeback entries and are written directly into GPRs 32, because two writeback ports were available at the beginning of cycle 5. In FIG. 8b, writeback pointer 82 does not advance beyond rename register number 4, because both writeback ports are used during cycle 5 to writeback the results of instructions INST x and INST x+1.

FIG. 8c shows the status of allocation pointer 80, writeback pointer 82, and completion pointer 84 at the start of cycle 7 of FIG. 7. As shown in FIGS. 7 and 8c, both writeback ports are used during cycle 6 to writeback the two results of instruction INST x+2. Accordingly, writeback pointer 82 has advanced from rename register number 4 to rename register number 6. Allocation pointer 80 is unchanged, because processor 10 has not dispatched additional instructions. Also, completion pointer 84 is unchanged, because processor 10 has not completed additional instructions.

FIG. 8d shows the status of allocation pointer 80, writeback pointer 82, and completion pointer 84 at the start of cycle 8 of FIG. 7. As shown in FIGS. 7 and 8c, both writeback ports are used during cycle 7 to writeback the two results of instruction INST x+3. Accordingly, writeback pointer 82 has advanced from rename register number 6 to rename register number 8. Allocation pointer 80 is unchanged, because processor 10 has not dispatched additional instructions. Also, completion pointer 84 is unchanged, because processor 10 has not completed additional instructions.

Figure 9:
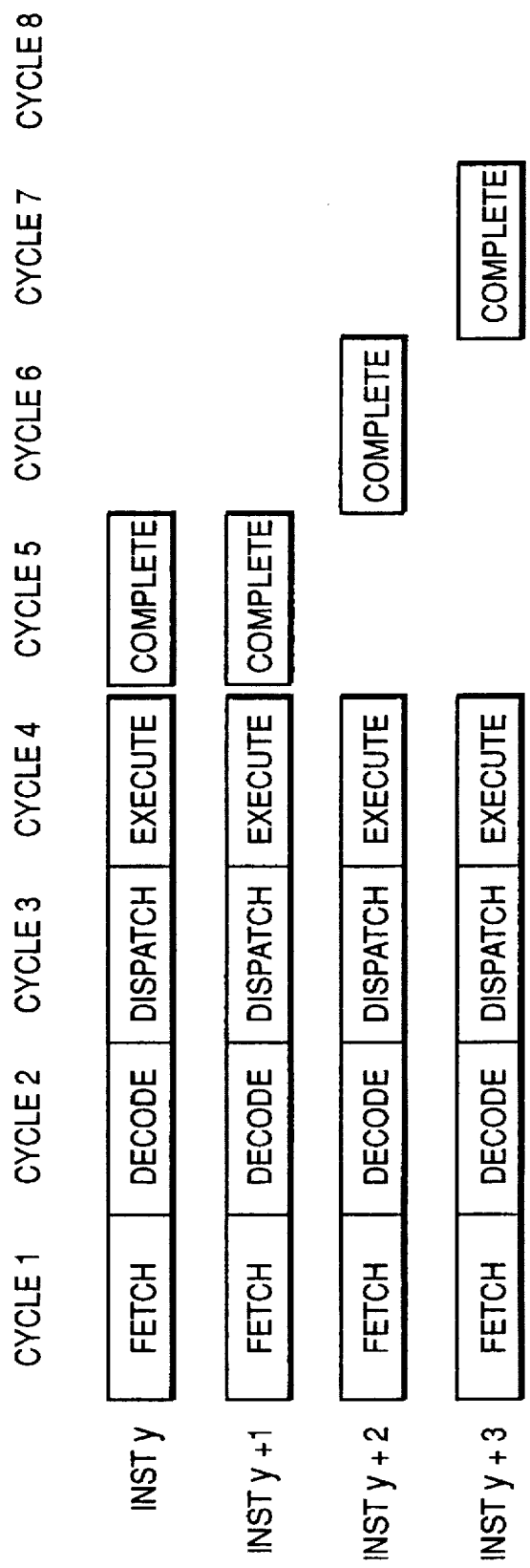
FIG. 9 is an illustration of the various stages of four instructions in a situation without a significant feature of the preferred embodiment.

FIG. 9 is an illustration of the various stages of four instructions in a situation without the significant feature of the preferred embodiment in which processor 10 separates completion from writeback. To illustrate such a situation, FIG. 9 shows the various stages of four instructions INST y, INST y+1, INST y+2, and INST y+3, which are respectively associated with reorder buffer numbers 7, 8, 9 and 10 of FIG. 6.

FIGS. 10a–d are conceptual illustrations of rename buffers of a processor according to FIG. 9. More particularly, FIG. 10a shows the status of an allocation pointer 90 and a completion pointer 94 at the start of cycles 4 and 5 of FIG. 9. FIG. 10b shows the status of allocation pointer 90 and completion pointer 94 at the start of cycle 6 of FIG. 9. FIG. 10c shows the status of allocation pointer 90 and completion pointer 94 at the start of cycle 7 of FIG. 9. FIG. 10d shows the status of allocation pointer 90 and completion pointer 94 at the start of cycle 8 of FIG. 9.

As shown in FIGS. 10a–d, without the significant feature of the preferred embodiment in which processor 10 separates completion from writeback, a particular instruction (having an allocated rename buffer) would be completed only after the particular instruction's result is actually copied from the allocated rename buffer for storage in an architectural register. By comparison, with the significant feature of the preferred embodiment in which processor 10 separates completion from writeback, processor 10 further maintains writeback pointer 82 to indicate whether a rename buffer (previously allocated to a particular instruction) is available for reallocation to another instruction. Moreover, processor 10 "completes" the particular instruction without regard to whether the particular instruction's result is actually copied from the allocated rename buffer for storage in an architectural register. Accordingly, processor 10 is able to "complete" up to four instructions in a particular cycle, even if each of the four instructions has two destination operands, and even if less than all of the destination operands are copied to GPRs 32 during the particular cycle.

Figure 11:
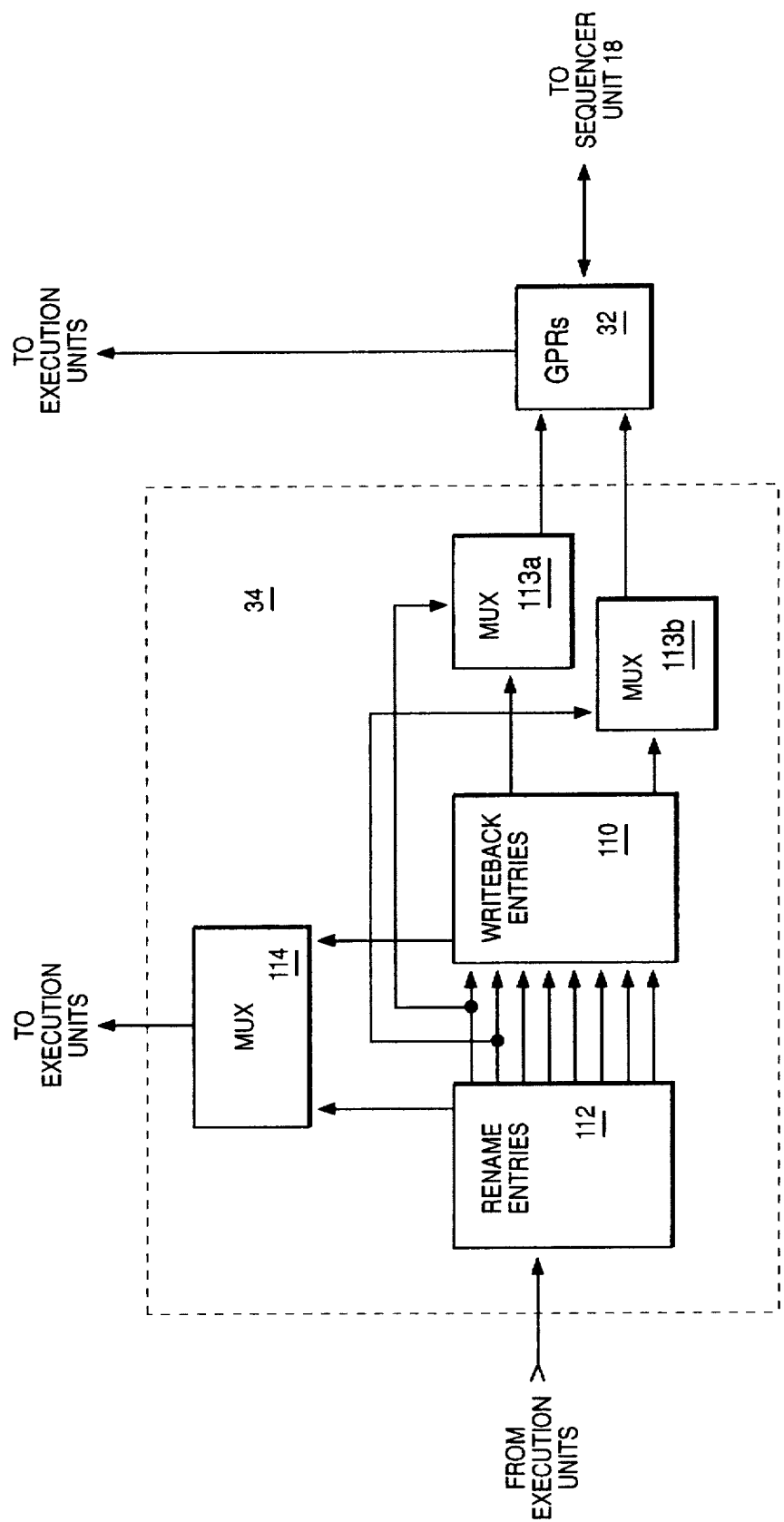
FIG. 11 is a block diagram of an alternative embodiment of rename buffers of the processor of FIG. 1.

FIG. 11 is a block diagram of an alternative embodiment of rename buffers 34 in which the "writeback entries" are stored in a buffer 110 separate from the "rename entries". The "rename entries" are stored in a buffer 112. Information from a "rename entry" of buffer 112 is output for storage in a "writeback entry" of buffer 110 during a particular cycle in response to completion during the particular cycle of a particular instruction for which the "rename entry" is allocated. Information from a "writeback entry" of buffer 110 is output for storage in one of GPRs 32 during a particular cycle in response to availability during the particular cycle of one of the two writeback ports to GPRs 32.

Buffer 112 outputs information to buffer 110 through any of eight ports as shown in FIG. 11, such that buffer 112 is able to output information to buffer 110 from up to eight "rename entries" during any particular cycle of processor 10. Accordingly, processor 10 is able to "complete" up to four instructions in a particular cycle, even if each of the four instructions has two destination operands, and even if less than all of the destination operands are copied to GPRs 32 during the particular cycle. Advantageously, a result (destination operand information) may bypass the "writeback entries" of buffer 110 and be written directly into GPRs 32 if a writeback port is available at the completion stage. Processor 10 achieves such bypassing by suitably operating multiplexers 113a and 113b, which are connected to buffers 110 and 112 and to GPRs 32 as shown in FIG. 11.

An advantage of the alternative embodiment of rename buffers 34 of FIG. 11 is that a rename entry in buffer 112 is reallocatable to another instruction after completion (yet prior to writeback) of the rename entry's previously associated instruction (for which the rename entry was previously allocated), because the rename entry's information is suitably output for storage in a writeback entry of buffer 110 in response to completion of the previously associated instruction. In yet another aspect of FIG. 11, a multiplexer 114 suitably outputs selected information to execution units from buffer 110 or from buffer 112 in situations where the execution unit executes an instruction specifying an architectural register associated with such information. Although processor 10 of the preferred embodiment has two writeback ports between the rename buffers and the architectural registers, a suitable number of writeback ports for a particular embodiment is a function of the likelihood that the rename entries and writeback entries will become full and therefore delay instruction dispatch.

As discussed further hereinabove in connection with FIGS. 2–5, processor 10 delays execution of an execution serialized instruction at least until completion of all preceding instructions in two situations. In a first situation, the instruction is not to be executed speculatively. In the second situation, the instruction specifies at least one source operand for which processor 10 does not include forwarding circuitry.

Concerning the first situation, some instructions operate on special purpose architectural registers ("SPRs") 40 (FIG. 1), where instructions' results are written directly to SPRs 40 without intermediate storage in rename buffers. An example of such an instruction is a Move To instruction which moves information to one of SPRs 40 from one of GPRs 32. As shown in FIG. 1, such Move To instructions are executed by CFXU 26. A Move To instruction immediately updates one of SPRs 40 upon execution. Similarly, a Store immediately updates a memory location in data cache 16 (FIG. 1) upon execution. Processor 10 does not speculatively execute such instructions (where the instructions' results are written directly to an architectural register or memory location without intermediate storage in rename buffers), so that processor 10 is able to achieve precise interrupts and precise exceptions. Accordingly, to ensure in-order completion and writeback, processor 10 delays execution of a Move To instruction and of a Store instruction until completion of all preceding instructions.

If an instruction dispatched to an execution unit has its associated EOK bit (in the "instruction type" field of the instruction's associated entry in reorder buffer 76) cleared to a logical 0, then execution serialization logic 84 outputs a signal (through a respective one of lines 60, 86, 88, 90, 92 and 94 connected to the execution unit) in response to "completion" of all instructions preceding the dispatched instruction. The execution unit executes such a dispatched instruction only in response to execution serialization logic 84 outputting the signal.

Figure 13:
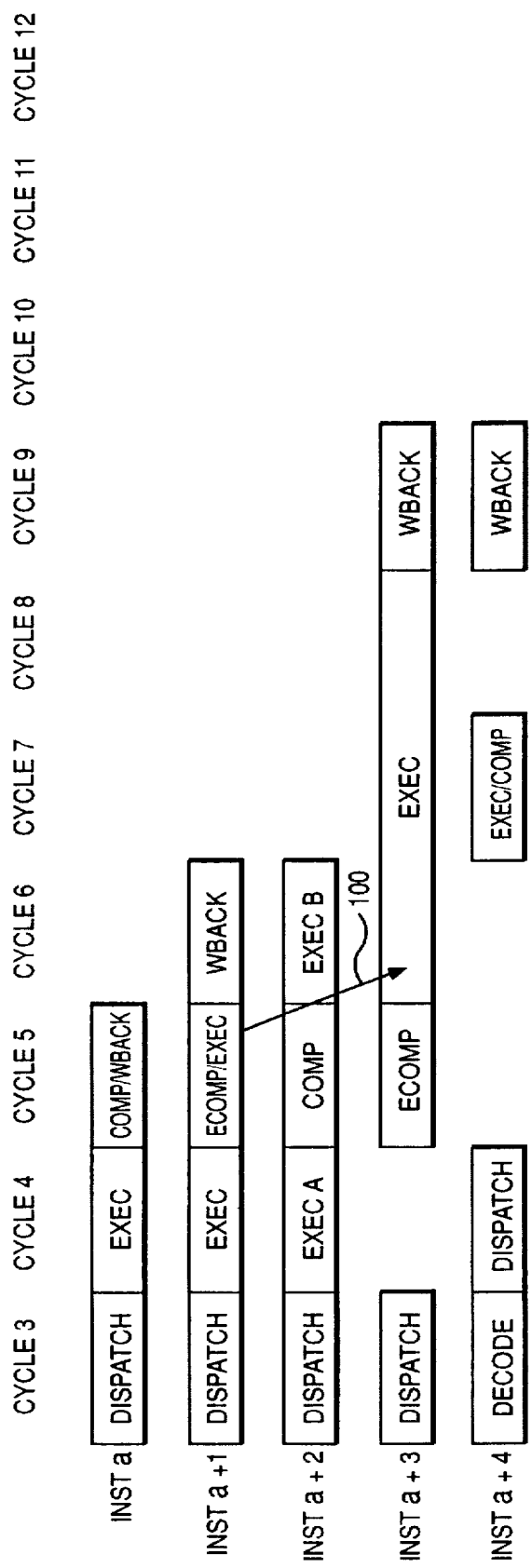
FIG. 13 is an illustration of the various stages of five instructions of FIGS. 12a–c.

FIGS. 12a–c are conceptual illustrations of reorder buffer 76. FIG. 13 is an illustration of the various stages of the five instructions of FIGS. 12a–c. FIGS. 14a–f are conceptual illustrations of rename buffers 34 of processor 10.

FIG. 12a shows the status of reorder buffer 76 at the start of cycle 4 of FIG. 13. Accordingly, in FIG. 12a, reorder buffer 76 stores information for four instructions dispatched during cycle 3 of FIG. 13. FIG. 13 shows the various stages of four instructions INST a, INST a+1, INST a+2, and INST a+3, which are respectively associated with reorder buffer numbers 3, 4, 5 and 6 of FIG. 12a.

As shown in FIG. 12a, instruction INST a is dispatched to FXUA 22 and has two destination operands ("number-of-GPR destinations"=2). By comparison, instruction INST a+1 is dispatched to FXUB 24 but has one destination operand ("number-of-GPR destinations"=1). Instruction INST a+2 is a Store instruction dispatched to LSU 28 and has zero destination operands ("number-of-GPR destinations"=0); moreover, reorder buffer number 5 (associated with instruction INST a+2) has EOK=0 in response to instruction INST a+2 being execution serialized. Instruction INST a+3 is dispatched to CFXU 26 and has one destination operand ("number-of-GPR destinations"=1).

In a significant aspect of the preferred embodiment, sequencer unit 18 determines whether an exception is possible to result from execution of an instruction. Sequencer unit 18 makes this determination in advance of the instruction's execution. If an exception is not possible for the instruction, sequencer unit 18 advantageously sets (in response to dispatching the instruction) "finished"=1 in the instruction's associated reorder buffer entry, independent of whether processor 10 has actually finished execution of the instruction for which an exception is not possible.

Moreover, in such a situation, processor 10 "completes" the instruction in response to processor 10 completing all preceding instructions, regardless of whether processor 10 has actually finished executing the instruction for which an exception is not possible. Accordingly, processor 10 "completes" the instruction in response to determining an exception does not result from execution of the instruction and of each instruction preceding the instruction in the programmed sequence, independent of whether processor 10 has finished execution of each instruction for which an exception is not possible. Thus, it is possible for the instruction's completion stage to precede the instruction's execute stage; in this manner processor 10 supports "early completion" of the instruction.

By supporting "early completion", processor 10 advantageously is able to more quickly execute a subsequent execution serialized instruction (such as a Move To instruction or a Store instruction) where the instructions' results are written directly to an architectural register or memory location without intermediate storage in rename buffers). This is true without degrading the ability of processor 10 to achieve precise interrupts and precise exceptions. This is because all preceding instructions either (1) have already finished execution without exceptions or (2) will finish execution without exceptions. With such a technique, processor 10 continues to ensure in-order completion and in-order writeback.

For example, in FIG. 12a, instructions INST a+1 and INST a+3 are not able to cause an exception, such that "finished"=1 in reorder buffer numbers 4 and 6. FIG. 14a shows the status of allocation pointer ("AL") 80, writeback pointer ("WB") 82, and completion pointer ("CO") 84 of rename buffers 34 at the start of cycle 4 of FIG. 13. Thus, FIG. 14a corresponds to FIG. 12a. As shown in FIG. 14a, WB 82 and CO 84 point to rename buffer 2, and AL 80 points to rename buffer 6. Rename buffers 2 and 3 are allocated to instruction INST a. Rename buffer 4 is allocated to instruction INST a+1, and rename buffer 5 is allocated to instruction INST a+3. Notably, instruction INST a+2 does not have an allocated rename buffer, because instruction INST a+2 has zero destination operands. In rename buffers 2–5, "information valid"=0, indicating that the "information" field of these rename buffers does not store valid data. At the start of cycle 4 (FIG. 13), "information valid"=0 because instructions INST a, INST a+1, INST a+2, and INST a+3 have not yet finished execution.

In rename buffer 4, "carry valid"=1, indicating that INST a+1 modifies CA register 42. Notably, as previously stated, instruction INST a+1 is not able to cause an exception, such that "finished"=1 in reorder buffer number 4 (FIG. 12a). Accordingly, processor 10 supports "early completion" of instructions that modify CA register 42.

As shown in FIGS. 14a–g, CA bit information is intermediately stored in rename buffers 34. Nevertheless, processor 10 of the preferred embodiment does not include circuitry for forwarding such CA bit information to execution units from rename buffers 34. If a particular instruction's source operand information includes CA register 42, then the particular instruction has a source operand information dependency upon the results of a preceding instruction (if any) that modifies CA register FIG. 12b shows the status of reorder buffer 76 at the start of cycle 5 of FIG. 13. Accordingly, in FIG. 12b, reorder buffer 76 stores information for instruction INST a+4 dispatched during cycle 4 of FIG. 13. FIG. 13 shows the various stages of instruction INST a+4, which is associated with reorder buffer number 7. As shown in FIG. 12b, instruction INST a+4 is dispatched to FXUA 22 and has one destination operand ("number-of-GPR destinations"=1); moreover, reorder buffer number 7 (associated with instruction INST a+4) has EOK=0 in response to instruction INST a+4 being execution serialized.

Moreover, since instruction INST a finished execution during cycle 4, "finished"=1 in reorder buffer number 3 in FIG. 12b. Referring to FIG. 13, instruction INST a+2 is a Store instruction. During cycle 4, LSU 28 finished a first execution stage EXEC A of the Store instruction INST a+2. During EXEC A, LSU 28 translates the Store instruction and checks the Store instruction for storage protection. Accordingly, "finished"=1 in reorder buffer number 5 in FIG. 12b.

FIG. 14b shows the status of allocation pointer ("AL") 80, writeback pointer ("WB") 82, and completion pointer ("CO") 84 of rename buffers 34 at the start of cycle 5 of FIG. 13. Thus, FIG. 14b corresponds to FIG. 12b. As shown in FIG. 14b, WB 82 and CO 84 continue pointing to rename buffer 2, and AL 80 has advanced from rename buffer 6 and points to rename buffer 7. Accordingly, rename buffer 6 is allocated to instruction INST a+4.

In rename buffer 6, "information valid"=0, indicating that the "information" field of this rename buffer does not store valid data. At the start of cycle 5 (FIG. 13), "information valid"=0 in rename buffer 6 because instruction INST a+4 has not yet finished execution. By comparison, in FIG. 14b, "information valid"=1 in rename buffers 2 and 3 in response to instructions INST a and INST a+1 finishing execution during cycle 4 as shown in FIG. 13, indicating that the "information" fields of rename buffers 2 and 3 store valid data (represented in FIG. 14b by "DATA" in the "information" fields).

In rename buffer 6, "carry valid"=1, indicating that INST a+4 modifies CA register 42. Moreover, source operand information of instruction INST a+4 includes CA register 42, such that INST a+4 is an execution serialized instruction with a source operand information dependency upon the results of preceding instruction INST a+1 which modifies CA register 42. Although instruction INST a+3 does not modify CA register 42, INST a+3 also has a source operand information dependency upon the results of preceding instruction INST a+1 as indicated in FIG. 13 by arrow 100.

FIG. 12c shows the status of reorder buffer 76 at the start of cycle 6 of FIG. 13. FIG. 14c shows the status of allocation pointer ("AL") 80, writeback pointer ("WB") 82, and completion pointer ("CO") 84 of rename buffers 34 at the start of cycle 6 of FIG. 13. Thus, FIG. 14c corresponds to FIG. 12c.

As shown in FIG. 12c, information in reorder buffer numbers 3, 4, 5 and 6 has been deleted in response to instructions INST a, INST a+1, INST a+2 and INST a+3 "completing" during cycle 5 as shown in FIG. 13. Notably, instruction INST a+1 "early completed" during cycle 5 prior to instruction INST a+1 finishing execution during cycle 5, as indicated in FIG. 13 by "ECOMP/EXEC"; instruction INST a+1 is a member of a class of instructions which require more than one cycle of processor 10 to execute.

Referring to FIG. 14c, processor 10 advances CO 84 past a rename buffer (e.g. past rename buffer 5 before the start of cycle 6) previously allocated to a particular instruction (e.g. INST a+3) in response to processor 10 completing all preceding instructions (e.g. INST a, INST a+1, and INST a+2), regardless of whether processor 10 has actually finished executing the particular instruction (e.g. INST a+3 which continues executing during cycles 6–8).

Also, during cycle 5, execution serialization logic 84 (FIG. 3) output a signal through line 92 connected to LSU 28 in response to completion of instructions INST a and INST a+1; this results from the fact that instruction INST a+2 (which was dispatched to LSU 28 during cycle 3) had its associated EOK bit in reorder buffer number 5 cleared to a logical 0.

During cycle 5, the Store instruction a+2 is "completed" in response to finishing (cycle 4) execution stage EXEC A without exceptions and to completion (cycle 5) of preceding instructions INST a and INST a+1. During a second execution stage EXEC B, LSU 28 actually writes information to a memory location of data cache 16. LSU 28 executes stage EXEC B of the Store instruction INST a+2 only in response to execution serialization logic 84 outputting the signal through line 92.

As shown in FIG. 14c, AL 80 continues pointing to rename buffer 7, and CO 84 has advanced from rename buffer 2 and points to rename buffer 6, in response to preceding instructions INST a, INST a+1 and INST a+3 "completing" during cycle 5. Moreover, as shown in FIG. 13, the two results of instruction INST a were copied from rename buffers 2 and 3 to GPRs 32 (FIG. 1) during cycle 5. Accordingly, as shown in FIG. 14c, WB 82 has advanced from rename buffer 2 and points to rename buffer 4; moreover, information in rename buffers 2 and 3 has been deleted in response to the two results of instruction INST a being copied from rename buffers 2 and 3 to GPRs 32 (FIG. 1) during cycle 5.

In FIG. 14c, "information valid"=1 in rename buffer 4 in response to instruction INST a+1 finishing execution during cycle 5 as shown in FIG. 13. This indicates that the "information" field of rename buffer 4 stores valid data (represented in FIG. 14c by "DATA" in the "information" field) and that the "carry" field of rename buffer 4 stores valid data (represented in FIG. 14c by "CA" in the "carry" field). Since INST a+4 is an execution serialized instruction with a source operand information dependency upon the results of instruction INST a+1 which modifies CA register 42, and since the "carry" field of rename buffers 34 is unforwarded, processor 10 delays execution of instruction INST a+4 until after the "carry" result of instruction INST a+1 is copied from rename buffer 4 to GPRs 32 (FIG. 1) during the writeback stage (WBACK) of instruction INST a+1 in cycle 6.

By comparison, instruction INST a+3 also has a source operand information dependency upon the DATA results of instruction INST a+1, but the "information" field of rename buffers 34 is forwarded. Accordingly, in response to "information valid"=1 in rename buffer 4 (indicating instruction INST a+1 finished execution during cycle 5), processor 10 initiates execution of instruction INST a+3 during cycle 6 prior to finishing the writeback stage of instruction INST a+1.

FIG. 14d shows the status of allocation pointer ("AL") 80, writeback pointer ("WB") 82, and completion pointer ("CO") 84 of rename buffers 34 at the start of cycle 7 of FIG. 13. As shown in FIG. 14d, AL 80 continues pointing to rename buffer 7, and CO 84 continues pointing to rename buffer 6. As shown in FIG. 13, the result of instruction INST a+1 was copied from rename buffer 4 to GPRs 32 (FIG. 1) during cycle 6. Accordingly, as shown in FIG. 14d, WB 82 has advanced from rename buffer 4 and points to rename buffer 5; moreover, information in rename buffer 4 has been deleted in response to the result of instruction INST a+1 being copied from rename buffer 4 to GPRs 32 (FIG. 1) during cycle 6.

In the preferred embodiment, for an execution serialized instruction (e.g. INST a+4) having a source operand information dependency upon an unforwarded operand (e.g. CA bit information destined for CA register 42), processor 10 executes the execution serialized instruction (e.g. INST a+4) in response to rename buffers 34 indicating:

(1) all preceding instructions are "complete"; and (2) if the writeback stage of any preceding "completed" instruction is not yet finished, any such preceding instruction does not modify the unforwarded operand.

Accordingly, in FIG. 14d, CO 84 points to rename buffer 6, thereby indicating for instruction INST a+4 that all preceding instructions are "complete". Moreover, in FIG. 14d, WB 82 points to rename buffer 5, thereby indicating that, although the writeback stage of preceding "completed" instruction INST a+3 is not yet finished, instruction INST a+3 does not modify any unforwarded information destined for CA register 42 (because "carry valid"=0 in rename buffer 5). Thus, processor 10 executes instruction INST a+4 during cycle 7.

In an alternative embodiment, for an execution serialized instruction (e.g. INST a+4) having a source operand information dependency upon an unforwarded operand (e.g. CA bit information destined for CA register 42), processor 10 executes the execution serialized instruction (e.g. INST a+4) in response to rename buffers 34 indicating:

(1) all preceding instructions are "complete"; and (2) the writeback stages of all preceding "completed" instructions are finished, such that WB 82 and CO 84 point to the same rename buffer.

FIG. 14e shows the status of allocation pointer ("AL") 80, writeback pointer ("WB") 82, and completion pointer ("CO") 84 of rename buffers 34 at the start of cycle 8 of FIG. 13. As shown in FIG. 14e, AL 80 continues pointing to rename buffer 7, and WB 82 continues pointing to rename buffer 5. Instruction INST a+4 finished execution and "completed" during cycle 7 prior to instruction INST a+4 finishing execution during cycle 7, as indicated in FIG. 13 by "EXEC/COMP". Accordingly, as shown in FIG. 14e, CO 84 has advanced from rename buffer 6 and points to rename buffer 7.

Advantageously, processor 10 advances CO 84 past a rename buffer (e.g. past rename buffer 6 before the start of cycle 8) previously allocated to a particular instruction (e.g. INST a+4) in response to processor 10 completing all preceding instructions (e.g. INST a, INST a+1, INST a+2 and INST a+3), regardless of whether processor 10 has actually finished executing all preceding instructions (e.g. INST a+3 which continues executing during cycle 8).

In FIG. 14e, "information valid"=1 in rename buffer 6 in response to instruction INST a+4 finishing execution during cycle 7 as shown in FIG. 13. This indicates that the "information" field of rename buffer 6 stores valid data (represented in FIG. 14e by "DATA" in the "information" field) and that the "carry" field of rename buffer 6 stores valid data (represented in FIG. 14e by "CA" in the "carry" field).

FIG. 14f shows the status of allocation pointer ("AL") 80, writeback pointer ("WB") 82, and completion pointer ("CO") 84 of rename buffers 34 at the start of cycle 9 of FIG. 13. As shown in FIG. 14f, AL 80 and CO 84 continue pointing to rename buffer 7, and WB 82 continues pointing to rename buffer 5. In FIG. 14f, "information valid"=1 in rename buffer 5 in response to instruction INST a+3 finishing execution during cycle 8. This indicates that the "information" field of rename buffer 5 stores valid data (represented in FIG. 14e by "DATA" in the "information" field).

Figure 14G:
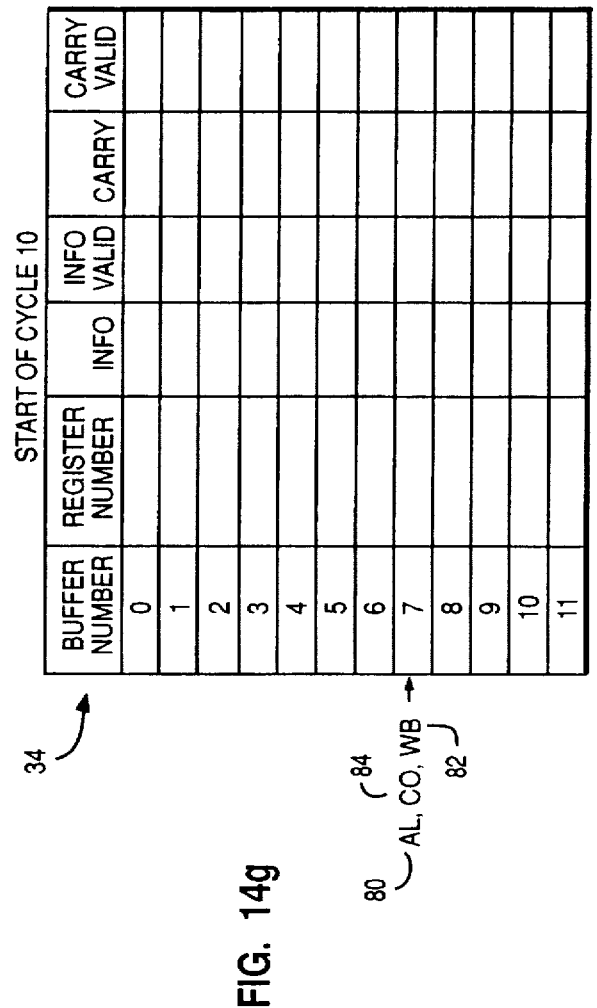

FIG. 14g shows the status of allocation pointer ("AL") 80, writeback pointer ("WB") 82, and completion pointer ("CO") 84 of rename buffers 34 at the start of cycle 10 of FIG. 13. As shown in FIG. 14g, AL 80 and CO 84 continue pointing to rename buffer 7. As shown in FIG. 13, the results of instructions INST a+3 and INST a+4 were copied from rename buffers 5 and 6, respectively, to GPRs 32 (FIG. 1) during cycle 9. Accordingly, as shown in FIG. 14g, WB 82 has advanced from rename buffer 5 and points to rename buffer 7; moreover, information in rename buffers 5 and 6 has been deleted in response to the results of instructions INST a+3 and INST a+4 being copied from rename buffers 5 and 6 to GPRs 32 (FIG. 1) during cycle 9.

Figure 15:
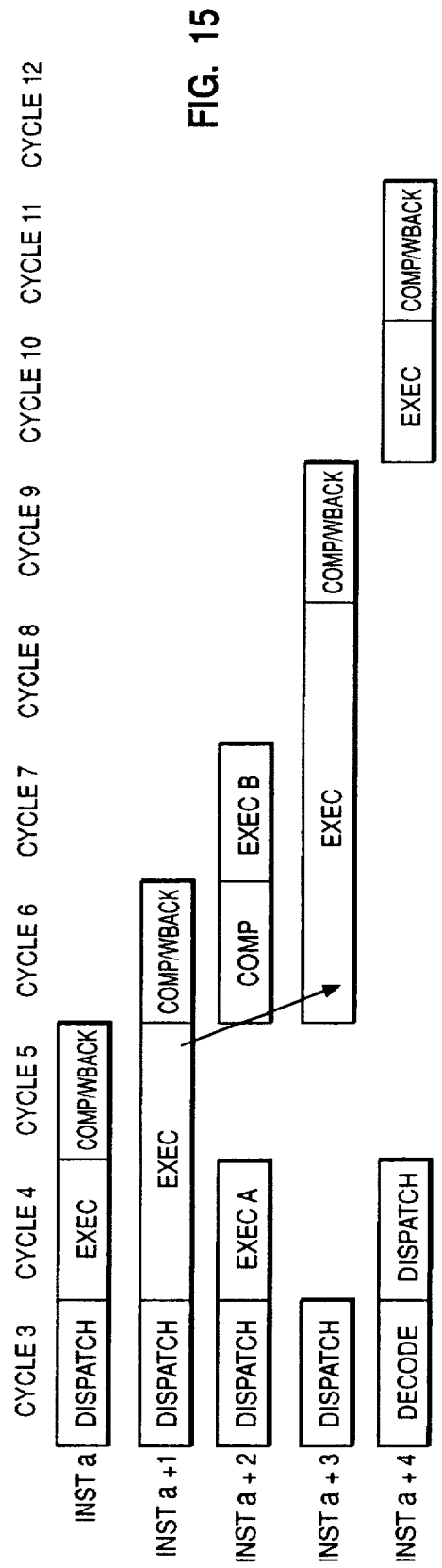
FIG. 15 is an illustration of the various stages of five instructions of FIGS. 12a–c in a situation without a significant feature of the preferred embodiment.

FIG. 15 is an illustration of the various stages of the five instructions of FIGS. 12a–c in an alternative embodiment without the "early completion" feature of the preferred embodiment. FIGS. 16a–h are conceptual illustrations of rename buffers 34 of processor 10 at various cycles of the instruction processing illustrated in FIG. 15. As shown in FIG. 15, without the "early completion" feature of the preferred embodiment, execution of instruction INST a+4 is delayed until cycle 10, and completion/writeback of the results of instruction INST a+4 is delayed until cycle 11. This results from the fact that instruction INST a+4 is an execution serialized instruction that is delayed in execution until completion of all preceding instructions. Without the "early completion" feature of the preferred embodiment, instruction INST a+3 does not complete until cycle 9, thereby delaying execution of instruction INST a+4 until cycle 10.

By comparison, in FIG. 13, instruction INST a+3 "early completes" during cycle 5, and instruction INST a+4 is executed during cycle 7. Instruction INST a+4 is an execution serialized instruction having a source operand information dependency upon the results of preceding instruction INST a+1 which modifies unforwarded CA bit information destined for CA register 42. Nevertheless, in FIG. 13, execution of instruction INST a+4 occurs during cycle 7, and completion/writeback of the results of instruction INST a+4 occurs during cycle 9. Accordingly, in FIG. 13 with the "early completion" feature of the preferred embodiment, execution, completion, and writeback stages of instruction INST a+4 occur earlier than in FIG. 15 without the "early completion" feature.

Processor 10 delays execution of an instruction specifying unforwarded source operands (e.g. SPRs 40 and CA register 42) at least until completion of all preceding instructions. This is because, where the instruction specifies unforwarded source operands, execution of the instruction is subject to such source operand information being available and valid in architectural registers. Examples of such instructions are (1) an extended arithmetic instruction that reads CA register 42 and (2) a Move From instruction which moves information from one of SPRs 40 to one of GPRs 32.

Even if all preceding instructions are "complete", it is possible for a preceding instruction to be "early completed" such that its completion stage precedes its execution stage. As discussed further hereinabove in connection with FIGS. 1–5, processor 10 includes circuitry for forwarding information to execution units from GPRs 32, FPRs 36, rename buffers 34 and 38, and control registers. If a particular instruction has a source operand information dependency upon the results of a preceding "early completed" instruction, and if the source operand information is supported by such forwarding circuitry of processor 10, then processor 10 delays execution of the particular instruction until processor 10 finishes the "early completed" instruction's execution stage (at which time the "early completed" instruction's results are available and valid in a rename buffer).

By comparison, if the source operand information is not supported by such forwarding circuitry of processor 10, then processor 10 delays execution of the particular instruction until processor 10 finishes the "early completed" instruction's writeback stage (at which time the "early completed" instruction's results are available and valid in an architectural register). If an "early completed" instruction is not finished executing, then the instruction's result (destination operand information) is not available. In such a situation, processor 10 accordingly delays the "early completed" instruction's writeback stage until the instruction finishes executing.

If an instruction is subject to early completion, then sequencer unit 18 outputs an indication signal while dispatching the instruction to the instruction's associated execution unit. In response to such an indication signal, the associated execution unit does not attempt to modify the instruction's assigned entry reorder buffer 76. This is because, upon completion of a reorder buffer entry's assigned instruction, the reorder buffer entry is subject to being reassigned to another instruction, such that information in the reorder buffer entry is no longer valid.

Accordingly, if an instruction is subject to early completion, then the instruction's assigned reorder buffer entry might be invalid before the instruction's execution unit finishes execution of the instruction. In the preferred embodiment, during a single cycle of processor 10, sequencer unit 18 inspects the four oldest reorder buffer entries having valid information, such that four instructions are candidates for completion simultaneously during the single cycle.

In the preferred embodiment, a Move From instruction inputs information from an SPR, and an SPR is modified only by a Move To instruction. Advantageously, processor 10 executes a Move From instruction in response to completion of all preceding instructions, even if one or more of the preceding instructions is "early completed". This is possible because processor 10 does not "early complete" an instruction (e.g. a Move To instruction or a Store instruction) which is not to be executed speculatively. If all preceding instructions are "complete", then processor 10 has actually finished execution of all preceding Move To instructions. Accordingly, processor 10 executes a Move From instruction in response to completion of all preceding instructions, because in such a situation processor 10 has actually finished execution of all preceding Move To instructions.

In another significant aspect of the preferred embodiment, processor 10 supports an imprecise nonrecoverable floating point exception mode. When operating under such a mode, processor 10 reports a floating point exception condition without being exact or informative as to which floating point instruction caused the exception condition. When processor 10 handles the exception, processor 10 is permitted to be in a state where it has completed a variable number of instructions beyond the floating point instruction that caused the exception. When operating under this mode, processor 10 achieves increased performance for instruction sequences that are not sensitive to program execution being stopped precisely at a floating point instruction causing an exception condition.

When operating under the precise floating point exception mode, processor 10 does not "early complete" a floating point instruction prior to finishing execution of the floating point instruction, even if all preceding instructions have completed.

By comparison, when operating under the imprecise nonrecoverable floating point exception mode, processor 10 "early completes" a floating point instruction before finishing execution of the floating point instruction, in response to completion of all preceding instructions. Under the imprecise nonrecoverable floating point exception mode, "early completed" floating point instructions are different from other types of "early completed" instructions, because processor 10 "early completes" a floating point instruction even though subsequent execution of the floating point instruction might actually result in a floating point exception condition. Each reorder buffer entry indicates whether its associated instruction is a floating point instruction.

In response to finishing the execution and completion stages of a floating point instruction, its results are intermediately stored in floating point rename buffers 38. The results are intermediately stored in rename buffers 38 until the results of all earlier floating point instructions are copied to FPRs 36. In this manner, processor 10 processes the respective "writeback" stages of floating point instructions in order of their programmed sequence.

Rename buffers 38 intermediately store results of floating point instructions for later copying to FPRs 36. Moreover, rename buffers 38 further store status information for suitably modifying an architectural floating point status and control register ("FPSCR") (not shown). In response to detecting a floating point exception (indicated by an FEX bit of FPSCR being set) while copying results from rename buffers 38 to FPRs 36 and to FPSCR, processor 10 reports the exception.

When operating under the imprecise nonrecoverable floating point exception mode, processor 10 reports a floating point exception condition without being exact or informative as to which floating point instruction caused the exception condition. Advantageously, in such a situation, processor 10 of the preferred embodiment reports an exception in the following manner.

First, processor 10 stops instruction completion during the cycle in which processor 10 detects the floating point exception. The exact instruction at which processor 10 stops completion is not important, so long as the state of processor 10 accurately reflects the effects of all completed instructions preceding the exact instruction at which processor 10 stops completion.

Second, processor 10 finishes execution of all preceding "early completed" instructions. Moreover, processor 10 copies results of such instructions to the architectural registers, such that all writeback entries in rename buffers 34 and 38 become empty.

Third, processor 10 reports the floating point exception. Under the imprecise nonrecoverable floating point exception mode, "early completed" floating point instructions are different from other types of "early completed" instructions, because processor 10 "early completes" a floating point instruction even though subsequent execution of the floating point instruction might actually result in a floating point exception condition. Accordingly, no other exception is generated by other instructions which are "early completed" or actually completed.

In response to detecting an exception resulting from a non-floating point instructions' processor 10 delays reporting the non-floating point exception until processor 10 finishes execution of all preceding "early completed" floating point instructions without encountering any floating point exception. Advantageously, in such a situation, processor 10 of the preferred embodiment reports an exception in the following manner.

First, processor 10 stops instruction completion during the cycle in which processor 10 detects the non-floating point exception. Processor 10 stops instruction completion at the instruction causing the non-floating point exception, so the instruction is not completed.

Second, processor 10 finishes execution of all preceding "early completed" instructions. This determines whether processor 10 is able to finish execution of all preceding "early completed" floating point instructions without encountering any floating point exception. Moreover, processor 10 copies results of such instructions to the architectural registers, such that all writeback entries in rename buffers 34 and 38 become empty. In this manner, a consistent state of processor 10 exists when processor 10 reports the exception. In addition, wait until the other writeback buffers are empty to present a consistent processor's state when the exception is recognized.

Third, if processor 10 has not detected a floating point exception, then processor 10 reports the precise non-floating point exception. By comparison, if processor 10 has detected a floating point exception, then processor 10 reports the imprecise nonrecoverable floating point exception.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. A method of operating a processing system, comprising the steps of:

determining whether an exception condition exists for an instruction to be dispatched to circuitry for execution;

dispatching said instruction to said execution circuitry; and in response to determining an exception condition exists for said instruction, inhibiting execution of said instruction by said execution circuitry so that said instruction is never executed by said execution circuitry.

2. The method of claim 1 wherein said inhibiting step comprises the step of outputting an indication to inhibit said execution while dispatching said instruction to said execution circuitry.

3. The method of claim 1 wherein said exception condition is an instruction fetch and decode related exception condition.

4. The method of claim 1 and further comprising the step of storing an indication of inhibiting in said execution circuitry.

5. The method of claim 1 and further comprising the step of storing an indication of said inhibiting in a reorder buffer.

6. The method of claim 1 and further comprising the step of processing said exception condition during a machine cycle of the processing system in which said instruction would have been otherwise executed absent said exception condition.

7. The method of claim 6 wherein said processing step comprises the step of processing said exception condition in response to completion of an instruction preceding said instruction in a sequence of instructions.

8. The method of claim 1 wherein said dispatching step comprises the step of dispatching multiple instructions during a single machine cycle of the processing system.

9. A processing system, comprising:

circuitry for executing an instruction; and dispatch circuitry for:

determining whether an exception condition exists for an instruction to be dispatched to said execution circuitry;

dispatching said instruction to said execution circuitry; and in response to determining an exception condition exists for said instruction, inhibiting execution of said instruction by said execution circuitry so that said instruction is never executed by said execution circuitry.

10. The system of claim 9 wherein said dispatch circuitry outputs an indication to inhibit said execution while dispatching said instruction to said execution circuitry.

11. The system of claim 9 wherein said exception condition is an instruction fetch and decode related exception condition.

12. The system of claim 9 wherein said execution circuitry stores an indication of said inhibiting.

13. The system of claim 9 and further comprising a reorder buffer for storing an indication of said inhibiting.

14. The system of claim 9 and further comprising circuitry for processing said exception condition during a machine cycle of the processing system in which said instruction would have been otherwise executed absent said exception condition.

15. The system of claim 14 wherein said exception processing circuitry processes said exception condition in response to completion of an instruction preceding said instruction in a sequence of instructions.

16. The system of claim 9 wherein said dispatch circuitry is operable to dispatch multiple instructions during a single machine cycle of the processing system.

\* \* \* \* \*